H. S. GRIGSBY.
HUMIDIFIER.
APPLICATION FILED FEB. 23, 1916.
1,219,391.
Patented Mar. 13, 1917.
2 SHEETS—SHEET 1.
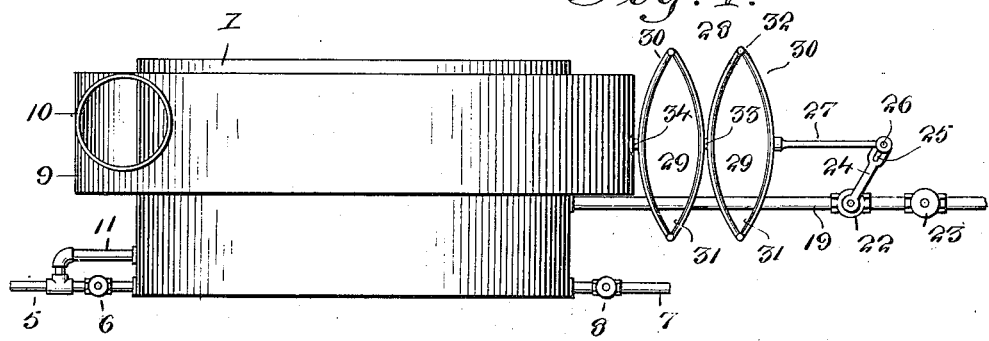
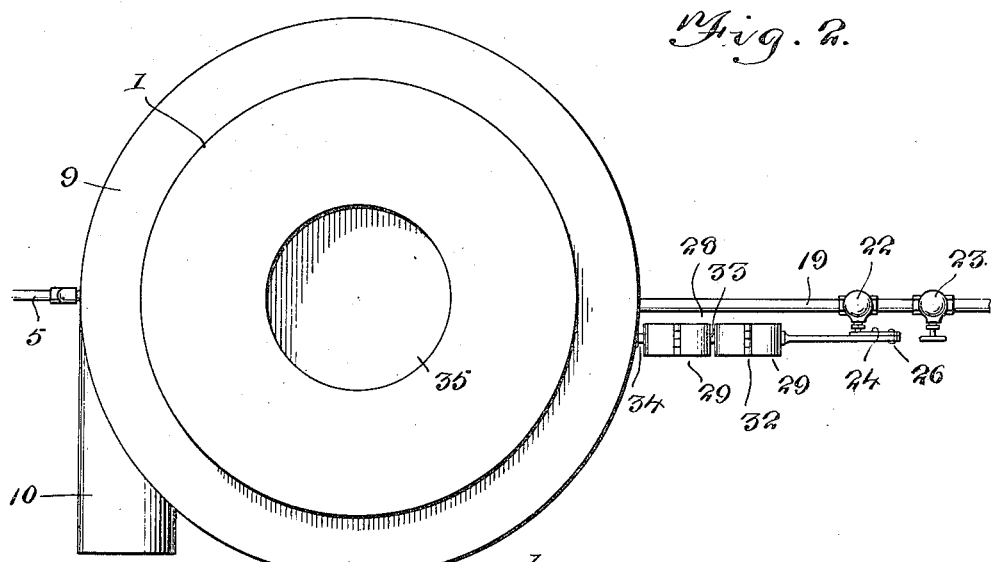
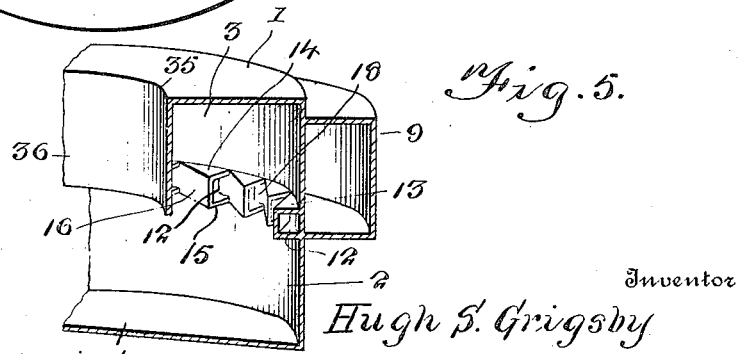
Inventor
Hugh S. Grigsby
By Victor J. Evans
Attorney
Witnesses

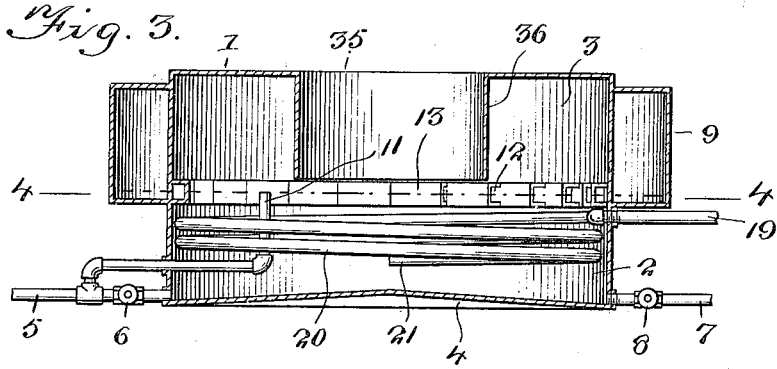
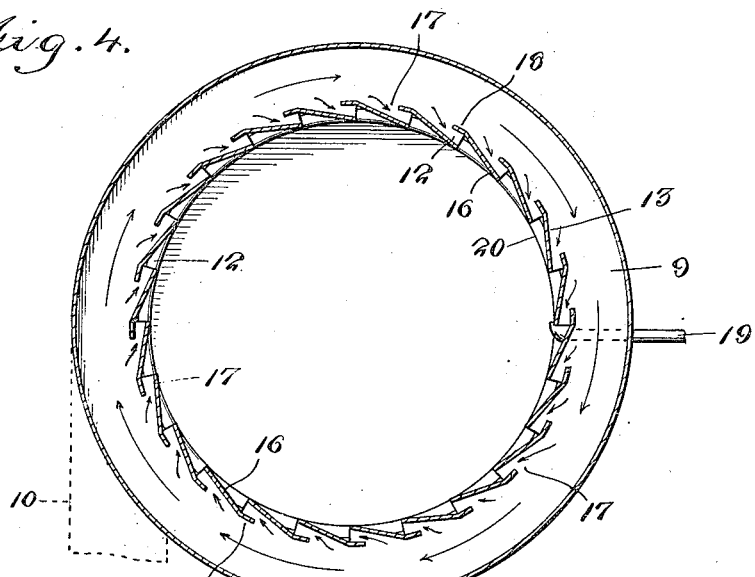
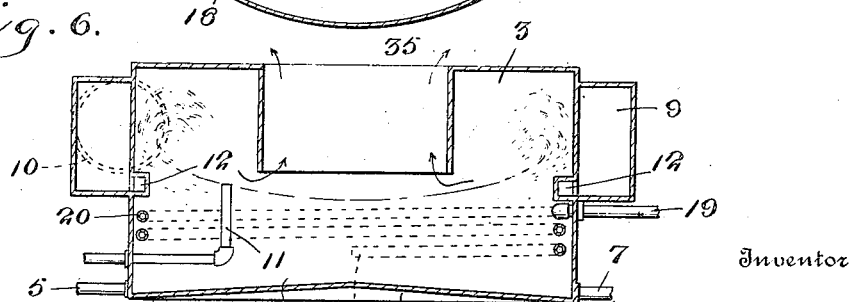

UNITED STATES PATENT OFFICE.

HUGH S. GRIGSBY, OF RICHMOND, VIRGINIA.

HUMIDIFIER.

1,219,391.

Specification of Letters Patent.  Patented Mar. 13, 1917.

Application filed February 23, 1916.  Serial No. 80,023.

*To all whom it may concern:*

Be it known that I, HUGH S. GRIGSBY, a citizen of the United States, residing at Richmond, in the county of Henrico and State of Virginia, have invented new and useful Improvements in Humidifiers, of which the following is a specification.

This invention relates to certain new and useful improvements in humidifiers for supplying moisture to the atmosphere of a room or apartment and maintaining the humidity thereof in a substantially constant state, the primary object of the invention being to provide a construction of apparatus whereby a more uniform, constant and fine admixture of moisture with the air is produced and the temperature of the humidified air governed and controlled to a highly efficient degree.

A further object of the invention is to provide a humidifier wherein the water stored for vaporization and combination with the supplied current of air will be kept heated to a predetermined temperature so as to facilitate the conversion of the water into vapor and to enable it to be more finely sprayed and combined with the molecules of air.

A further object of the invention is to provide a humidifier wherein the water stored for vaporization and combination with the supplied current of air is initially furnished in the form of steam and condensed for use, thereby supplying water of a high degree of purity and in best condition for conversion into vapor, the steam being condensed in a condenser cooled by a body of water in which it is arranged and which is constantly replenished by the supply and condensation of the steam to maintain a constant store of water for the condensing and vaporizing actions.

A further object of the invention is to provide a humidifier wherein provision is made for keeping a constant source of heated water within the device for use while the device is in service, for conducting and agitating the air and water to effect the saturation of the air with moisture in a rapid and efficient manner, for draining off all refuse and deposits at desired intervals in a ready and convenient manner, and for governing the supply of steam to the condenser according to the hygrometric conditions of the atmosphere to vary the level of the water with relation to the maximum level point at which vaporization is effected, so as to maintain the humidity of the air substantially constant and regular at all times.

With these and other objects in view, the invention consists of the features of construction, combination and arrangement of parts hereinafter fully described and claimed, reference being had to the accompanying drawings in which:—

Figure 1 is a side elevational view of a humidifier and automatic controller constructed in accordance with my invention.

Fig. 2 is a top plan view of the same.

Fig. 3 is a vertical section taken on a line parallel with the plane of the water supply and waste pipes.

Fig. 4 is a horizontal section taken on the line 4—4 of Fig. 3 coincident with the level of the water in the air chamber.

Fig. 5 is a sectional perspective view of a portion of the apparatus.

Fig. 6 is a vertical section similar to Fig. 3, with omissions, and illustrating diagrammatically the water and air circulating and vaporizing actions.

In the practical embodiment of my invention as illustrated in the present instance, I provide a preferably circular casing 1 constructed of sheet metal or other suitable material and forming a lower water storage and steam condensing chamber 2 and an upper vaporizing chamber or compartment 3. The chamber 2 is preferably provided with a bottom 4 which slopes from the center toward its periphery to provide for the drainage off of water and foreign material contained therein in a ready manner. At one side the chamber 2 is provided at its lowest point with a waste or drain pipe 5 provided with a controlling valve 6 and through which pipe the contents of the the chamber may be drawn off whenever desired for convenience in making repairs, cleaning the apparatus and for other similar purposes. Also communicating with the lower portion of the chamber 2, preferably at the side thereof opposite the pipe 5, is a water supply pipe 7 provided with a controlling valve 8 whereby a supply of water may be initially furnished in starting the apparatus into operation and also for flushing said chamber to discharge waste products.

Surrounding the upper chamber or compartment 3 of the casing is an annular air chamber or channel 9 which is provided at an appropriate point with a tangentially arranged inlet 10. Through this inlet air is supplied to the interior of the chamber 9 from a fan, blower, or other source of air supply under a determined pressure for circulation about said compartment 9 and passage therefrom into the vaporizing chamber 3. The chamber 2 and lower portion of the chamber 3 are filled in practice with water up to a level slightly above the bottom of the chamber 9, the bottom of which coincides with the imaginary line of division between the chambers 2 and 3, and an overflow pipe 11 is provided for conducting any excess supply of water from the interior of the casing to the waste pipe 5, whereby the water is automatically maintained at a predetermined maximum level.

The air supplied through the inlet 10 to the compartment 9 flows under the pressure at which it is delivered around said compartment, as indicated by the large arrows in Fig. 4, and thence flows with portions of water from said compartment into the base of the compartment 3 through an annular series of tangential passages 12 formed in the wall of the casing 1. These passages are guarded on their inner sides within the chamber 1 by triangular hoods or deflectors 13, each formed of top, bottom and side walls 14, 15 and 16 having inlets 17 leading to the said passages at their bases or enlarged portions, the side walls of the respective deflectors forming obliquely arranged guide surfaces which terminate at their outer ends in wings 18 concentric with the walls of the casings. These wings 18 of the respective walls 16 are arranged to overlap the inner ends of adjacent walls, thus providing the inlets 17 which are sufficiently constricted to effect a fine division of the air and particles of moisture flowing therewith, so that the passages perform the function of tangential jet nozzles adapted to allow a certain proportion of air and water to feed therethrough for humidification in the chamber 3.

The water employed for humidifying the air is supplied, according to my invention, by condensing steam conducted from a suitable source of steam supply through a pipe 19 to one end of a condensing coil 20 arranged within the water supply chamber or compartment 2. The coil 20 is connected at its upper end with the delivery end of the pipe 19 and has its lower end 21 open to form an outlet for the discharge of the water of condensation from the steam into said chamber or compartment 2. The coil is submerged in the relatively cooler water contained in the compartment whereby the steam as supplied is condensed, the water of condensation flowing into the compartment and replenishing the water supply thereof and the stored body of water being in turn heated by the steam and water of condensation, by means of which a constant supply of water, heated to a greater or less degree according to the amount of steam supplied, will be at all times kept within the apparatus for use.

Arranged within the pipe 19 is a controlling or regulating valve 22 and a cut-off valve 23, which latter is normally open but may be closed when the apparatus is not in use to cut off the supply of steam. The valve 22 is provided with a lever arm 24 having a slot 25 receiving and engaging a pivot pin 26 on one end of a rod 27 connecting said lever arm with a hygrostatic controller 28 influenced by the hygrometric conditions of the atmosphere to adjust said lever arm and valve to vary and regulate the supply of steam to the apparatus as required. The controller 28 may be and preferably is of the type shown in my copending application, No. 80,027, filed of even date herewith, and consists of a desired number of units 29 each composed of a pair of hygroscopic strips 30 of wood or other hygroscopic material having their relatively inner faces provided each with a layer or coating 31 of non-hygroscopic material, such as metal, shellac, wax, etc., and the said outer surfaces of the strips being directly exposed to the moisture of the atmosphere, whereby the opposing surfaces have different coefficients of expansion. The strips 30 are connected at their ends by hinges or pivots 32 and the inner strips of the pair of units 29 shown are united by connecting means 33, while the inner strip of the inner unit is supported from the chamber 9 or some other suitable portion of the apparatus, as indicated at 34. The expansion of the outer surfaces of the strips 30 to a greater or less degree according to the degree of humidity of the atmosphere causes the units to bow to a greater or less extent and expand laterally so as to adjust the lever arm 24 to open or close the regulator valve 22 to regulate the supply of steam to the condensing coil. It will thus be understood that the regulating valve, which is normally open, will be closed to a greater or less degree proportionate to the degree of saturation of the air contained within the room or apartment and will operate to supply more or less steam as required, and which will be automatically governed in supply by the hygrometric conditions, to both vary the level of the water in the humidifier with relation to the maximum level point and also regulate the temperature of the water to increase or reduce the amount of water supplied for humidification. By thus varying the amount of water as well as its temperature it will be apparent that the degree of saturation of the air will be much better governed and controlled than by simply regulating a supply of cold water, as the degree and rapidity of conversion of the water into vapor and its combination with the air is affected and controlled to a very large extent by its temperature.

In the operation of the apparatus, a primary charge of water is first supplied through the pipe 7 by opening the valve 8, after which the valve is closed and the valve 23 opened for the supply of steam to the condenser controlled by the valve 22 governed by the action of the hygrostatic controller. The steam supplied to the coil 20 is condensed therein and discharges into the body of water contained in the casing, the water being heated by radiation from the coil as well as by the warm water discharged thereinto and mingling therewith. The apparatus having been primed for operation, air is supplied thereto through the inlet 10 from the source of supply and flows around the chamber 9 and through the passages 12 into the chamber 3 where it absorbs a certain amount of the moisture which is converted into a mist or spray which commingles with the air and is discharged therewith through a discharge outlet 35. This outlet 35 is formed in the top wall of the chamber 3 and communicates with a discharge passage formed by a tubular baffle or guard 36 depending from said top wall of the chamber 3 and in open communication with said chamber 3 at its bottom at a point just above the level of the inlets 12. By the use of this depending baffle or guard the air is caused to circulate around said chamber and to effect a conversion of the water into spray and take up or absorb the same without liability of a premature discharge, as well as to prevent the circulating water from bodily discharging or splashing out of the vaporizing chamber.

The bottom of the air inlet chamber 9 being below the normal level of the water, the air under pressure entering said chamber at a tangent and flowing around the chamber causes a surface friction, by means of which the water is carried around with it and a circulation of the column of water therein thus established. This water, under the action of centrifugal force, tends to bank and be at its highest elevation at the outer side of and against the wall of the chamber 9 and to be depressed at its inner side adjacent to the passages 12. The air discharging into the chamber 9 through these passages 12 will therefore carry with it particles of water, by which a certain amount of water is taken up and absorbed, but as the air travels in the same manner around the wall of the chamber 3 and tends to bank against said wall and to be depressed at the center below the lower end of the guard 35, it will be seen that the inlets 12 and their hoods or guards will be kept submerged and consequently the air flowing through said inlets will dash the water through which it flows in the form of spray against the wall of the chamber 3. By this action and the tendency to the division of the water and its absorption by the air through the agitating action of the deflectors 16, it will be understood that the air will be saturated to a greater or less degree with the moisture, dependent upon the level of the water in the chamber 3, as well as the temperature of the water, before its discharge through the opening 35 into the atmosphere. Owing to this action a finer division of the water will be obtained and a more thorough and intimate commingling of the water vapor with the molecules of air will be secured, since the water when heated to a degree above atmospheric temperature will vaporize and combine more thoroughly with the air, than is possible with humidifiers which rely solely upon a blast or ordinary spraying action or which employ the cold water or water at the temperature at which it comes from the mains. Furthermore, as both the amount and temperature of the water will be controlled by the hygrostatic controller, according to hygrometric and temperature conditions of the atmosphere in the room or apartment, it will be apparent that an operation which simulates to a high degree the natural process of humidifying the air is established, variations of temperature changes reduced and over or under saturation of the air avoided to a highly efficient extent.

I claim:—

1. A humidfier comprising a casing having a lower compartment for containing a body of water and an upper compartment communicating at its lower portion with the upper portion of said lower compartment and adapted to serve as a commingling or vaporizing chamber, an annular series of tangential nozzles arranged at a level substantially coincident with the line of communication of said compartments, and an air chamber surrounding said casing and communicating with said nozzles.

2. A humidifier comprising a casing having a lower compartment for containing a body of water and an upper compartment communicating at its lower portion with the upper portion of said lower compartment and adapted to serve as a commingling or vaporizing chamber, an annular series of tangential nozzles arranged at a level substantially coincident with the line of communication of said compartments, an air chamber surrounding said casing and communicating with said nozzles and a tangential air inlet communicating with said air casing.

3. A humidifying apparatus comprising a casing having a lower compartment for containing a body of water and an upper compartment communicating at its lower portion with the upper portion of said lower compartment and adapted to serve as a commingling or vaporizing chamber, an air chamber surrounding said casing, an annular series of tangential air nozzles connecting said air chamber with said compartments at a level substantially coincident with the line of communication of said compartments, and a tubular outlet leading from the top of the upper compartment downwardly into said compartment to a point in proximity to the level of the nozzles.

4. A humidifying apparatus comprising a casing having a lower compartment for containing a body of water, and an upper compartment communicating at its lower portion with the upper portion of said lower compartment and adapted to serve as a commingling or vaporizing chamber, means for supplying water to the lower compartment and maintaining a water level substantially coincident with the line of communication between the compartments, an air chamber surrounding said casing and having its lower portion arranged slightly below the normal level of the water in said water compartment, an annular series of tangential nozzles connecting the lower portion of said air chamber with said compartments at a level substantially coincident with their line of communication, and a tubular outlet depending from the top of the upper compartment to a point in proximity to the water level.

5. A humidifying apparatus comprising a casing having a lower compartment for containing a body of water and an upper compartment communicating at its lower portion with the upper portion of said lower compartment and adapted to serve as a commingling or vaporizing chamber, an annular series of tangential nozzles communicating with said compartments at a level substantially coincident with their line of communication and the level of the water, an air chamber surrounding the casing and communicating with the nozzles and having its bottom wall arranged slightly below the water level, a tubular outlet extending from the top of the upper compartment downwardly to a point in proximity to the water level, a condensing coil arranged so as to be submerged in said water compartment and having an outlet communicating therewith, means for supplying steam for condensation to said coil, and means for maintaining the water in the casing at a substantially indicated level.

6. A humidifying apparatus comprising a casing having a lower compartment for containing a body of water and an upper compartment communicating at its lower portion with the upper portion of said lower compartment and adapted to serve as a commingling or vaporizing chamber, an air chamber surrounding the casing and having its bottom disposed at an elevation slightly below the line of communication between said compartments and the intended level of the water in the lower compartment, an annular series of tangential air inlets connecting the bottom portion of said air chamber with said compartments substantially at a level coincident with the line of communication between said compartments and the water level, a steam condensation coil arranged within the water compartment for condensing charges of steam and discharging the condensate into said water compartment, means for supplying steam to the coil, an overflow pipe extending into the water compartment to the water level point, and a tubular outlet depending from the top of the upper compartment downwardly to a point above but in proximity to the water level line.

In testimony whereof I affix my signature in presence of two witnesses.

HUGH S. GRIGSBY.

Witnesses:
ERNST W. FARLEY,
A. L. FENNER, Jr.